(12) United States Patent
Weinraub et al.

(10) Patent No.: US 10,235,899 B1
(45) Date of Patent: Mar. 19, 2019

(54) MUSICAL INSTRUMENT HAND OR ARM OR FINGER LOCATOR DEVICE

(71) Applicant: Weinraub Enterprises Inc., Orange, CA (US)

(72) Inventors: Kara Weinraub, Orange, CA (US); Marc Jeffrey Seal, San Juan Capistrano, CA (US)

(73) Assignee: Weinraub Enterprises, Inc., Orange, CA (US)

( * ) Notice: Subject to any disclaimer, the term of this patent is extended or adjusted under 35 U.S.C. 154(b) by 0 days.

(21) Appl. No.: 15/923,425

(22) Filed: Mar. 16, 2018

(51) Int. Cl.
*G09B 15/06* (2006.01)

(52) U.S. Cl.
CPC .................................. *G09B 15/06* (2013.01)

(58) Field of Classification Search
CPC ....................................................... G09B 15/06
See application file for complete search history.

(56) References Cited

U.S. PATENT DOCUMENTS

| 3,854,370 | A | 12/1974 | Sapinski |
| 6,005,175 | A | 12/1999 | Johnson |
| 6,040,509 | A | 3/2000 | Fanella |
| 7,205,468 | B1 * | 4/2007 | Johnson ................. G10G 5/005 84/327 |
| 9,576,562 | B1 | 2/2017 | Porter et al. |
| 9,892,653 | B1 | 2/2018 | Hansen |
| 2005/0072292 | A1 | 4/2005 | Ellestad et al. |
| 2015/0302759 | A1 * | 10/2015 | Everett .................... G10D 3/06 84/293 |

* cited by examiner

*Primary Examiner* — Kimberly Lockett
(74) *Attorney, Agent, or Firm* — Larry K. Roberts

(57) ABSTRACT

A locator device for removable attachment to a musical instrument body to locate a musician's hand or arm while holding or manipulating the instrument. The locator device includes a guide structure for providing a contact surface for the musician's hand or arm. An attachment structure is connected to the guide structure for removably attaching the guide structure to the instrument body at a location selected to locate the musician's hand or arm in relation to the instrument, the attachment structure configured to detach from the instrument body without damaging the body.

7 Claims, 6 Drawing Sheets

MUSICAL INSTRUMENT HAND OR ARM OR FINGER LOCATOR DEVICE

BACKGROUND

While learning how to play an instrument, such as a guitar for illustrative purposes, it is difficult for the student to place his or her hand to be in the same location on the instrument each time the instrument is played. Using the example of a guitar, the student's ability to train, learn and feel the relative proximity of the string locations is hampered by not knowing or keeping the hand at the desired location and distance from between the strings, until the student excels to the point that it becomes automatic and habit.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1A:
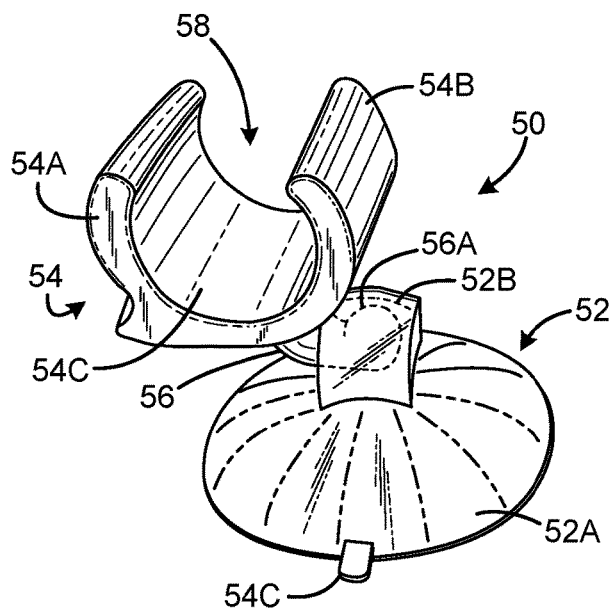
FIG. 1A is an isometric view of a first embodiment of a locator device for locating a finger on a musical instrument.

In the following detailed description and in the several figures of the drawing, like elements are identified with like reference numerals. The figures are not to scale, and relative feature sizes may be exaggerated for illustrative purposes.

Embodiments of this invention provide a locator device for accurately locating a musician's finger, hand or arm while holding or manipulating the musical instrument. For example, the musical instrument may be a stringed instrument, and the locator device is configured to locate the musician's hand in relation to the instrument strings.

Figure 2A:
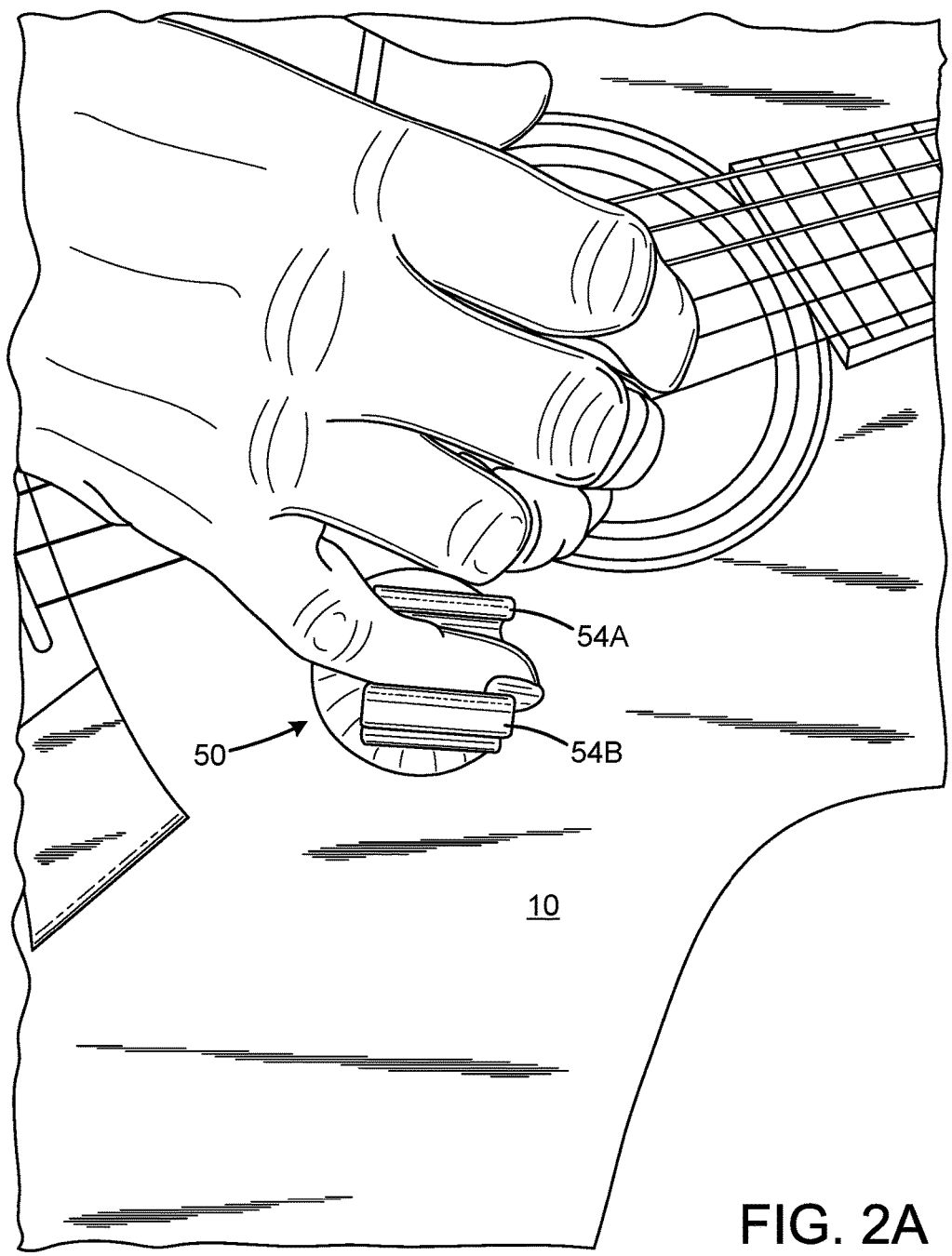
FIG. 2A is a fragmentary top isometric view of the embodiment of FIG. 1A, disposed on the body of a guitar.

A preferred embodiment 50 of the invention is illustrated in FIGS. 1A and 2A, and includes a base 52 to which is attached a guide structure 54 providing a contact surface for locating the musician's hand or arm. For this example, the instrument is a guitar with a guitar body and strings. In this embodiment, the guide structure is a generally U-shaped finger guide structure, with side portions 54A, 54B extending from a base portion 54C, defining a channel 58 sized to fit the musician's finger, as illustrated in FIG. 2A. The base 52 in this embodiment includes a pliable rubber or silicon suction cup structure 52A that can easily be adhered to the guitar 10 by suction. The guide structure 54 is attached to the base 52 by a curved post structure 56, which has an end 56A fitted into a boss 52B of the base structure. The guide structure 54 and post 56 may be an integrally formed structure, e.g. molded of a rigid plastic material. Alternatively, the post 56 may be a separate element from the guide structure, fitted or molded into the guide structure. The locator device 50 may be provided in various sizes or shapes to accommodate different size hands or comfort preferences.

The suction cup 52 also allows the device 50 to be installed on virtually any guitar/instrument, in any location and without any damage to the guitar/instrument or its finish. A tab 52C may be formed with the cup, to allow the user a convenient structure to pull, releasing the suction force and allowing the device 50 to be readily removed from the instrument. The location or placement of the device on the guitar can be adjusted if needed, anywhere on the guitar, providing a place on the musical instrument to locate the musician's finger for repeatable hand and/or finger location, particularly useful when the musician is learning to play.

Other embodiments of the locator device may adhere the device to the instrument using one of, or a combination of, methods including but not limited to tape, double stick or double-sided tape, glue, adhesives, clips or screws. These other forms of installation methods may not be as desirable as the suction cup embodiment 50, unless the user wants the placement of the locator device to be permanent, or not concerned of the potential marring or damage to the finish on the instrument. Some tapes are designed for removal without damaging the surface to which the tape adheres, and these could be utilized to attach the device as well.

Figure 1B:
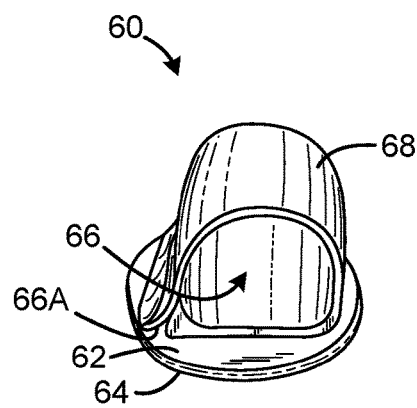
FIGS. 1B, 1C and 1D are respective isometric views of second, third and fourth embodiments of a locator device.
Figure 2B:
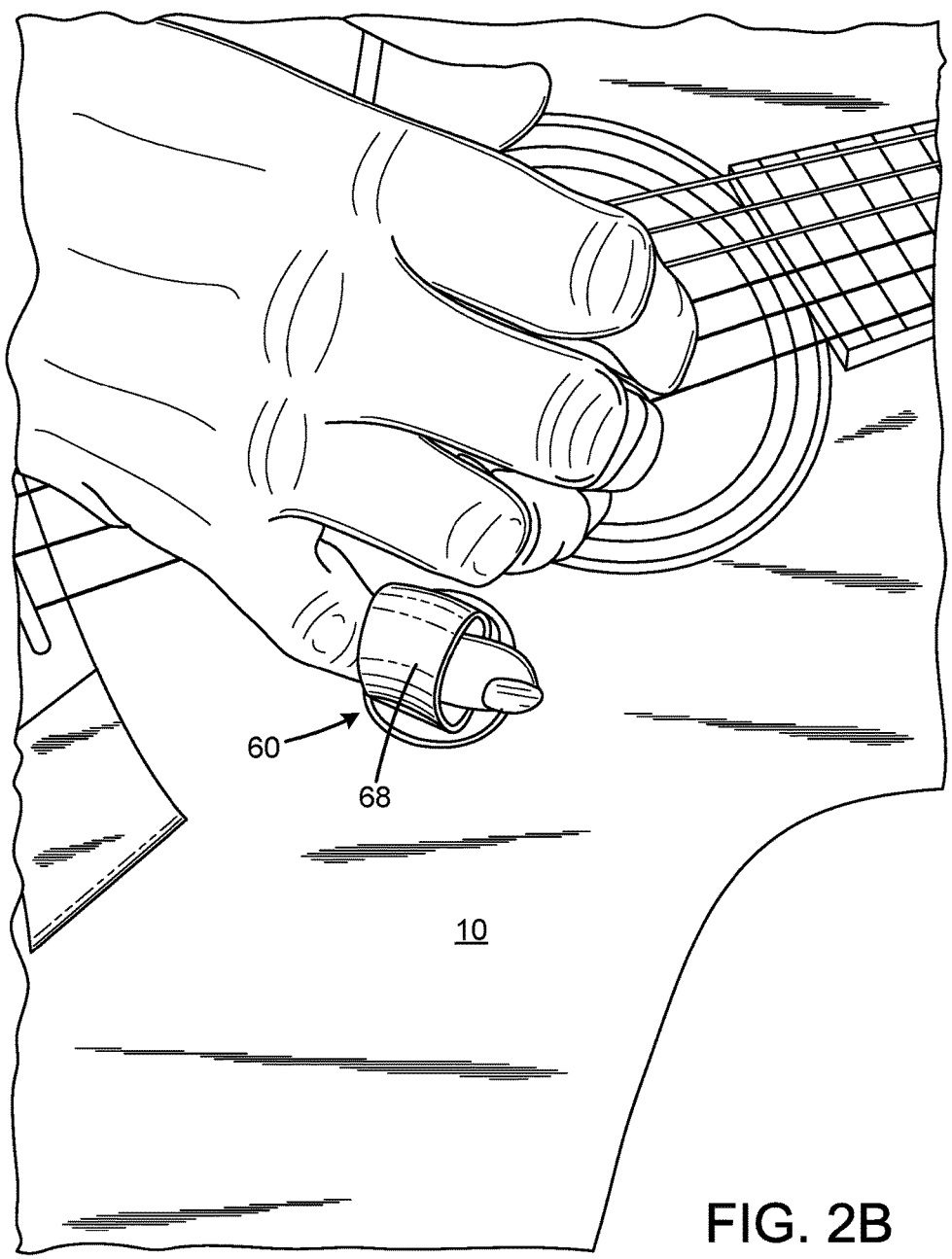
FIGS. 2B, 2C and 2D are respective fragmentary top views of the embodiments of FIGS. 1B, 1C and 1D disposed on the body of a guitar.

FIGS. 1B and 2B illustrate an alternate embodiment of a locator device 60. The device includes a base 62 and a finger-engaging structure 68. Reference 64 depicts a tape or glue layer for adhering the base 62 of the device 60 to a musical instrument body, such as guitar body 10 (FIG. 2B). The device 60 also includes a finger-engaging portion 68, which forms a loop defining a passageway or channel 66 sized to accept the musician's finger, as shown in FIG. 2B. The finger-engaging portion and the base portion may be fabricated as a unitary structure, with the structure 68 forming a flap which covers the passageway. The device 60 can be formed of a plastic material molded to the shape illustrated, and may be pliable, with the flap portion 68 at one side disengageable from the base portion at 66A.

Figure 1C:
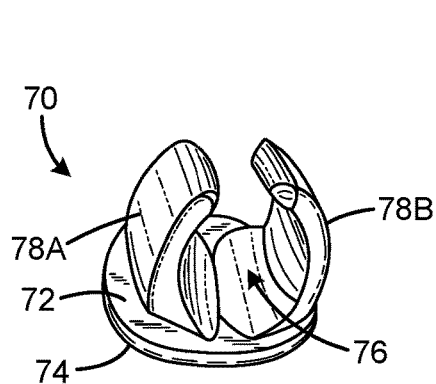
Figure 2C:
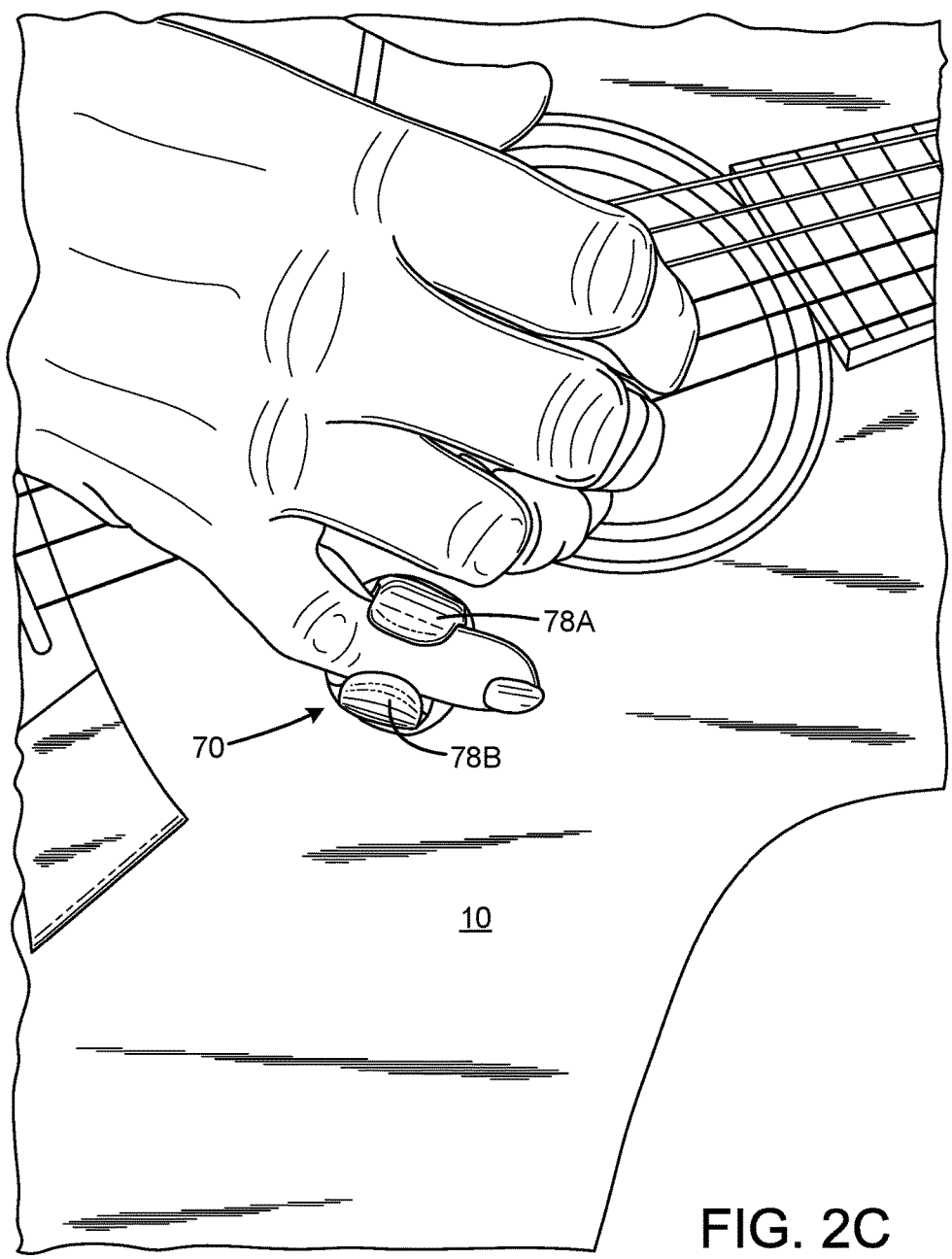

FIGS. 1C and 2C illustrate a further embodiment of a training device 70. The device 70 is a unitary molded structure, made of a rigid plastic material, with a base structure 72, and upstanding arms 78A, 78B which define a channel 76 through which the musician's finger can be inserted, as shown in FIG. 2C. The base structure may be attached to the musical instrument body 10 by tape or adhesive layer 74.

Figure 1D:
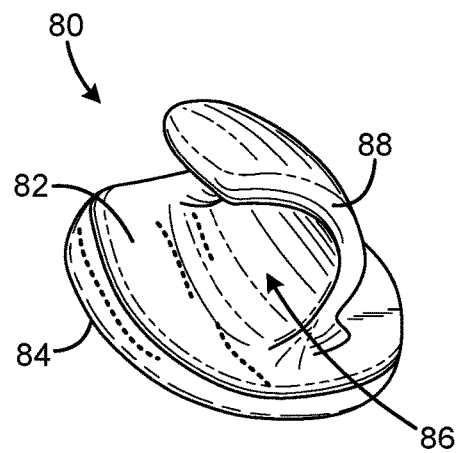
Figure 2D:
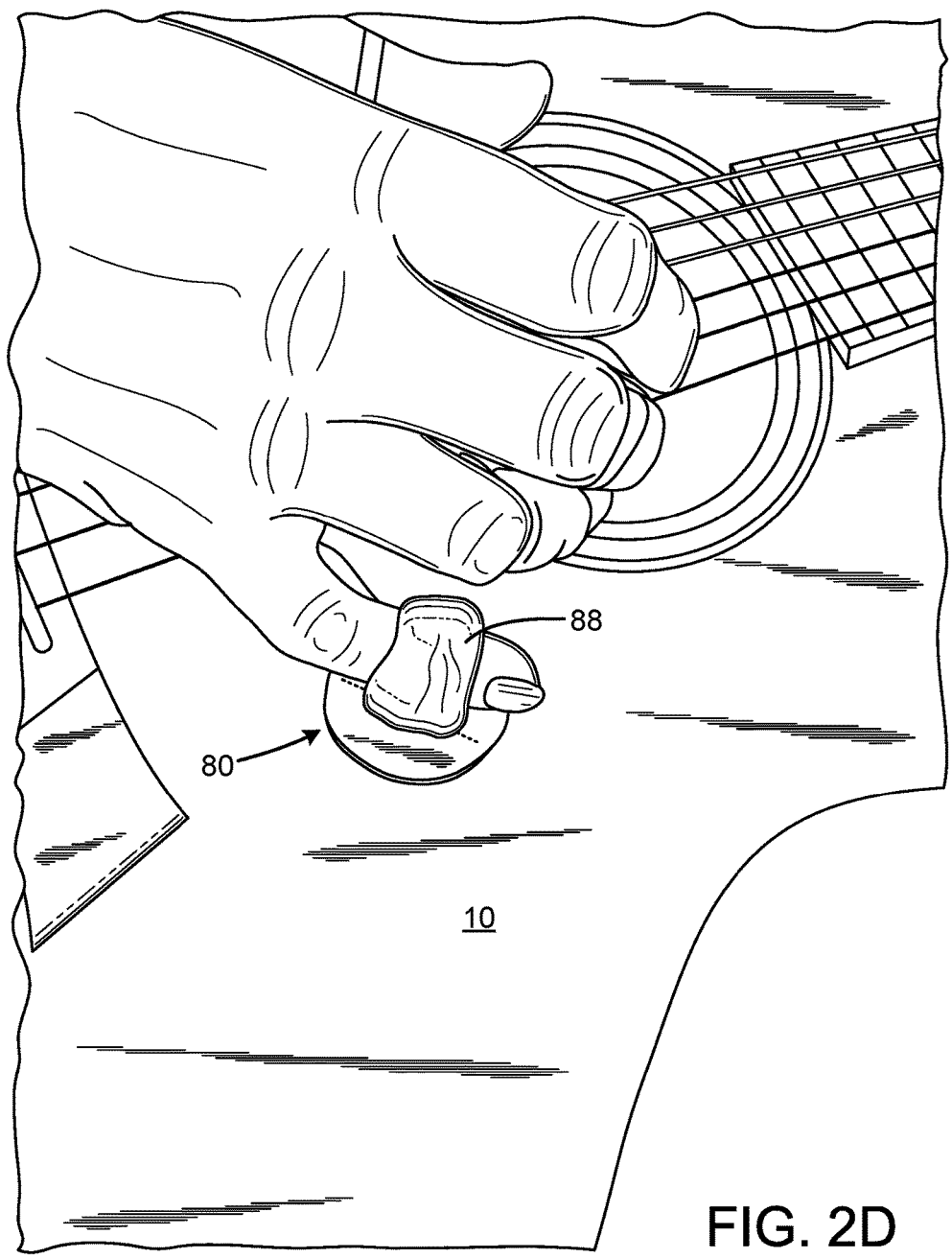

A further embodiment of a training device 80 is shown in FIGS. 1D and 2D. The device 80 is a unitary molded structure, made of a rigid or pliable plastic material, with a base structure 82, and an upstanding curved hook-like boss 88 which defines a channel 86 in which the musician's finger can be inserted, as shown in FIG. 2C. The base structure may be attached to the musical instrument body 10 by tape or adhesive layer 84.

Figure 3A:
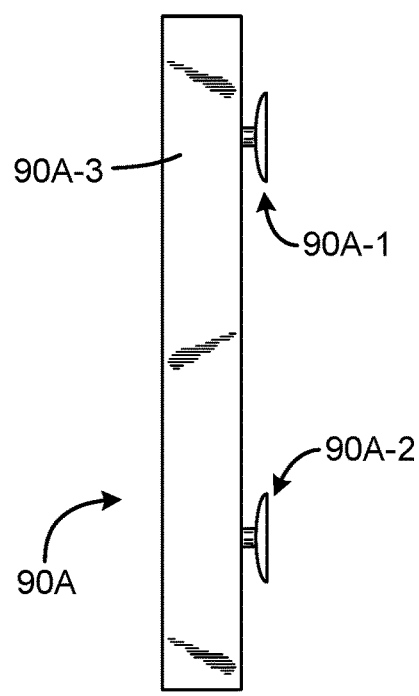
FIGS. 3A and 3B are respective side views of further embodiments of a locator device.
Figure 3B:
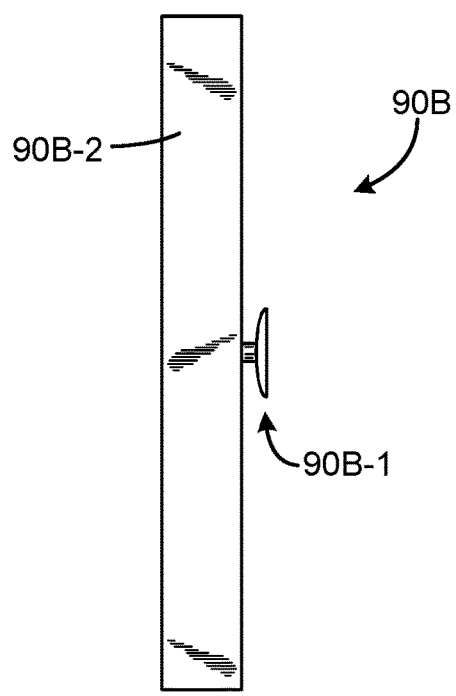

Yet another variation of a training device is an elongated version that will provide the same benefits as above, large enough to help position the placement of your arm or wrist on the instrument. FIGS. 3A and 3B illustrate exemplary embodiments 90A and 90B. Each embodiment includes an elongated strip 90A-3, 90B-2, respectively, made of a rubber or synthetic rubber material, five to six inches long or so, with a height of one half inch or so and width of one inch or so. The strip is attachable to the musical instrument by suction cups 90A-1 and 90A-2 in the case of device 90A (FIG. 3A), or 90B-1 in the case of device 90B (FIG. 3B). The devices 90A or 90B can be attached to the instrument body so that the musician's arm or wrist can rest against it as a stop to provide a repeatable and consistent location on the instrument. The strip 90A-3 or 90B-2 can be L-shaped or curved at one end.

Although the foregoing has been a description and illustration of specific embodiments of the subject matter, various modifications and changes thereto can be made by persons skilled in the art without departing from the scope and spirit of the invention.

What is claimed is:

1. A locator device for removable attachment to a stringed musical instrument body to locate a musician's hand or arm while holding or manipulating the instrument, the locator device comprising:
   a guide structure for providing a contact surface for the musician's hand or arm; and
   an attachment structure connected to the guide structure for removably attaching the guide structure to the instrument body at a location selected to locate the musician's hand or arm in relation to the instrument, the attachment structure configured to detach from the instrument body without damaging the body, wherein the attachment structure comprises a suction cup attached to the guide structure and a post connecting the suction cup to the guide structure; and
   wherein the guide structure comprises an elongated strip of rubber or a silicon rubber, having a length of at least five inches, and configured to provide the contact surface for locating the arm or wrist of the musician in relation to strings of the instrument.

2. A locator device for removable attachment to a musical instrument body to locate a musician's hand or arm while holding or manipulating the instrument, the locator device comprising:
   a guide structure for providing a contact surface for the musician's hand or arm; and
   an attachment structure connected to the guide structure for removably attaching the guide structure to the instrument body at a location selected to locate the musician's hand or arm in relation to the instrument, the attachment structure configured to detach from the instrument body without damaging the body; and wherein:
   the guide structure comprises a base portion and a loop portion defining a channel sized to accept a musician's finger, the loop portion providing the contact surface; and
   the attachment structure comprises a layer of double-sided tape configured to adhere the base portion to the instrument body.

3. A locator device for removable attachment to a musical instrument body to locate a musician's hand or arm while holding or manipulating the instrument, the locator device comprising:
   a guide structure for providing a contact surface for the musician's hand or arm; and
   an attachment structure connected to the guide structure for removably attaching the guide structure to the instrument body at a location selected to locate the musician's hand or arm in relation to the instrument, the attachment structure configured to detach from the instrument body without damaging the body; and wherein:
   the guide structure comprises a base portion and first and second spaced upstanding arm portions defining a channel sized to accept a musician's finger; and
   the attachment structure comprises a layer of double-sided tape configured to adhere the base portion to the instrument body.

4. A locator device for removable attachment to a musical instrument body to locate a musician's hand or arm while holding or manipulating the instrument, the locator device comprising:
   a guide structure for providing a contact surface for the musician's hand or arm; and
   an attachment structure connected to the guide structure for removably attaching the guide structure to the instrument body at a location selected to locate the musician's hand or arm in relation to the instrument, the attachment structure configured to detach from the instrument body without damaging the body; and wherein:
   the guide structure comprises a base portion and an upstanding hook-like boss portion extending from the base portion, the boss portion providing the contact surface; and
   the attachment structure comprises a layer of double-sided tape configured to adhere the base portion to the instrument body.

5. The locator device of claim 2, wherein the musical instrument is a guitar with strings, and the locator device is configured to locate the hand of the musician in relation to the guitar strings.

6. A locator device for removable attachment to a stringed musical instrument body to locate a musician's hand or arm while or manipulating the strings of the instrument, the locator device comprising:
   a guide structure for providing a contact surface for placement of a finger of the musician's hand; and
   an attachment structure connected to the guide structure for removably attaching the guide structure to the instrument body at a location selected to locate the musician's hand in relation to the instrument strings, the attachment structure configured to detach from the instrument body without damaging the body; and
   wherein the attachment structure comprises a suction cup and a post connecting the suction cup to the guide structure, and wherein the suction cup includes a boss portion, and an end of the post is secured to the boss.

7. The device of claim 6, wherein the guide structure comprises a generally U-shaped finger guide structure, with opposed side portions extending from a base portion to define a channel, sized to allow a finger of the musician to fit into the channel, the side portions and the base portion defining the contact surface.

* * * * *